United States Patent
Mankowski et al.

(10) Patent No.: US 9,390,308 B2
(45) Date of Patent: Jul. 12, 2016

(54) FINGERPRINT SCANNING METHOD

(71) Applicant: BlackBerry Limited, Waterloo (CA)

(72) Inventors: Peter Mankowski, Waterloo (CA); Neil Patrick Adams, Waterloo (CA); Ravi Singh, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/485,060

(22) Filed: Sep. 12, 2014

(65) Prior Publication Data

US 2016/0078268 A1 Mar. 17, 2016

(51) Int. Cl.
*G06K 9/00* (2006.01)
*G06F 21/32* (2013.01)

(52) U.S. Cl.
CPC .............. *G06K 9/0002* (2013.01); *G06F 21/32* (2013.01); *G06K 9/00087* (2013.01)

(58) Field of Classification Search
USPC ......... 382/115, 116, 124, 209, 278; 340/5.53, 340/5.83
See application file for complete search history.

(56) References Cited

U.S. PATENT DOCUMENTS

| | | | | |
|---|---|---|---|---|
| 6,785,407 B1 * | 8/2004 | Tschudi | ............... | G06K 9/0002 382/124 |
| 7,280,679 B2 * | 10/2007 | Russo | ................... | G06F 3/0414 340/5.53 |
| 7,393,711 B2 * | 7/2008 | Bolis | .................... | G06K 9/0002 257/417 |
| 7,474,772 B2 * | 1/2009 | Russo | .................... | G06F 3/033 345/157 |
| 7,660,447 B2 * | 2/2010 | Fujii | .................. | G06K 9/00013 356/395 |
| 7,797,549 B2 * | 9/2010 | Main | ...................... | G06F 21/14 340/5.26 |
| 7,929,736 B2 * | 4/2011 | Bechtel | ............... | G06F 3/03545 340/5.53 |
| 8,555,077 B2 * | 10/2013 | Davis | .................... | G06F 21/316 713/182 |
| 8,590,021 B2 * | 11/2013 | Steeves | ................. | G06F 21/316 713/168 |
| 8,682,606 B2 * | 3/2014 | Horodezky | ........... | G06F 1/1624 702/141 |
| 2008/0235762 A1 | 9/2008 | Gutta | | |
| 2010/0008552 A1 | 1/2010 | Shin et al. | | |
| 2014/0140586 A1 | 5/2014 | Case | | |

OTHER PUBLICATIONS

European Patent Office, Extended European Search Report on Application No. 15182821.7, Issued on Apr. 8, 2016.

* cited by examiner

*Primary Examiner* — Yosef Kassa (74) *Attorney, Agent, or Firm* — Moffat & Co.

(57) ABSTRACT

A computer-implemented method entails capturing a digital fingerprint of a finger using a fingerprint-capturing device, collecting pressure measurements using pressure sensors associated with the fingerprint-capturing device as the finger contacts the fingerprint-capturing device, determining a finger-sensor contact direction from the pressure measurements and storing the finger-sensor contact direction in association with the digital fingerprint for subsequent biometric authentication.

20 Claims, 7 Drawing Sheets

FINGERPRINT SCANNING METHOD

TECHNICAL FIELD

The present technology relates generally to biometric authentication techniques and, in particular, to fingerprint scanning.

BACKGROUND

Biometric authentication utilizes physical characteristics or traits (biometrics) of the human body to identify the user. One commonly used technique is to capture a digital fingerprint or fingerprint scan and to compare the digital fingerprint against a previously recorded sample of the digital fingerprint. There exist, unfortunately, various techniques for defeating a fingerprint authentication system by presenting a copy of the fingerprint image to the scanner. It is thus highly desirable to provide an improved fingerprint scanning technique.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology provides a technique for augmenting the security of a fingerprint scan by also detecting a finger-sensor contact direction, i.e. a finger-roll direction of a finger as it rolls in contact with an imaging device or scanner.

Accordingly, one aspect of the present technology is a computer-implemented method that entails steps, acts or operations of capturing a digital fingerprint of a finger using a fingerprint-capturing device, collecting pressure measurements using pressure sensors associated with the fingerprint-capturing device as the finger contacts the fingerprint-capturing device, determining a finger-sensor contact direction from the pressure measurements, and storing the finger-sensor contact direction in association with the digital fingerprint for subsequent biometric authentication.

Another aspect of the present technology is a non-transitory computer-readable medium comprising instructions in code which when loaded into a memory and executed by a processor of a computing device cause the computing device to non-transitory computer-readable medium comprising instructions in code which when loaded into a memory and executed by a processor of a computing device cause the computing device to capture a digital fingerprint of a finger using a fingerprint-capturing device, collect pressure measurements using pressure sensors associated with the fingerprint-capturing device as the finger contacts the fingerprint-capturing device, determine a finger-sensor contact direction from the pressure measurements, and store the finger-sensor contact direction in association with the digital fingerprint for subsequent biometric authentication.

Another aspect of the present technology is a computing device comprising a fingerprint-capturing device for capturing a digital fingerprint of a finger, pressure sensors associated with the fingerprint-capturing device to collect pressure measurements as the finger contacts the fingerprint-capturing device, wherein the processor is configured to determine a finger-sensor contact direction from the pressure measurements and to cause the memory to store the finger-sensor contact direction in association with the digital fingerprint for subsequent biometric authentication. In one implementation, the digital fingerprint is stored on a smart card external to the device capturing the digital fingerprint. The fingerprint may then be extracted from the smart card for matching purposes or, alternatively, the extracted fingerprint (and any associated direction/pressure/speed data) is sent to the smart card to be processed on the smart card which returns a positive or negative identification response without transmitting the fingerprint data from the card.

The details and particulars of these aspects of the technology will now be described below, by way of example, with reference to the drawings.

By way of overview, the present technology provides an improved method for fingerprint scanning that not only obtains a digital fingerprint but also detects the direction of the finger as it rolls over the fingerprint scanner or sensor. This method is implemented on a computing device 100 that comprises a fingerprint-capturing device 200 for capturing a digital fingerprint of a finger. The fingerprint-capturing device may be any fingerprint imager, reader, scanner or sensor capable of generating an image, model, map, representation or topography of the finger in sufficient detail to permit comparison with at least one other previously stored fingerprint for the purposes of biometrically authenticating a user of the computing device.

The fingerprint-capturing device 200 may be optical, ultrasonic or capacitance-based.

An optical fingerprint imager captures a digital image of the print using visible light. The upper layer of the sensor, on which the finger is placed, is the touch surface under which is a light-emitting phosphor layer for illuminating the finger. The light reflected from the finger travels through the phosphor layer to a charge-coupled device which captures the image of the fingerprint.

An ultrasonic sensor employs ultrasonographic techniques to create an image of the fingerprint. The ultrasonic sensor emits very high frequency sound waves that penetrate the epidermal layer. Piezoelectric transducers are used to emit and receive the sound waves.

A capacitance-based sensor employs an array of pixels each acting as one plate of a parallel-plate capacitor, with the electrically conductive dermal layer acting as the other plate, and the non-conductive epidermal layer acting as a dielectric material. The capacitance-based sensor may be active or passive. An active capacitance sensor uses a charging cycle to apply a voltage to the skin prior to measurement. The electric field between the finger and the sensor tracks the pattern of ridges in the dermal layer. On the discharge cycle, the voltage potential across the dermal layer and the sensor is measured against a reference voltage to calculate a capacitance value. The distance values are then calculated to generate an image of the fingerprint. A passive capacitance sensor generates an image of the fingerprint patterns on the dermal layer of skin. Each sensor pixel is used to measure the capacitance at a given point of the array. The capacitance varies between the ridges and valleys of the finger.

The computing device used to implement this novel method of scanning a fingerprint by also determining a finger-sensor contact direction may comprise any desktop computer, laptop computer, tablet, notebook, smart phone, personal digital assistant, smart card reader, accessory or the like. This technology may be applied to kiosks, portable navigation units, vehicle computer systems, gaming consoles, smart appliances, biometric locks, biometric alarm systems, or any other electronic apparatus, machine, device, system or equipment requiring user authentication by means of a digital fingerprint.

Figure 1:
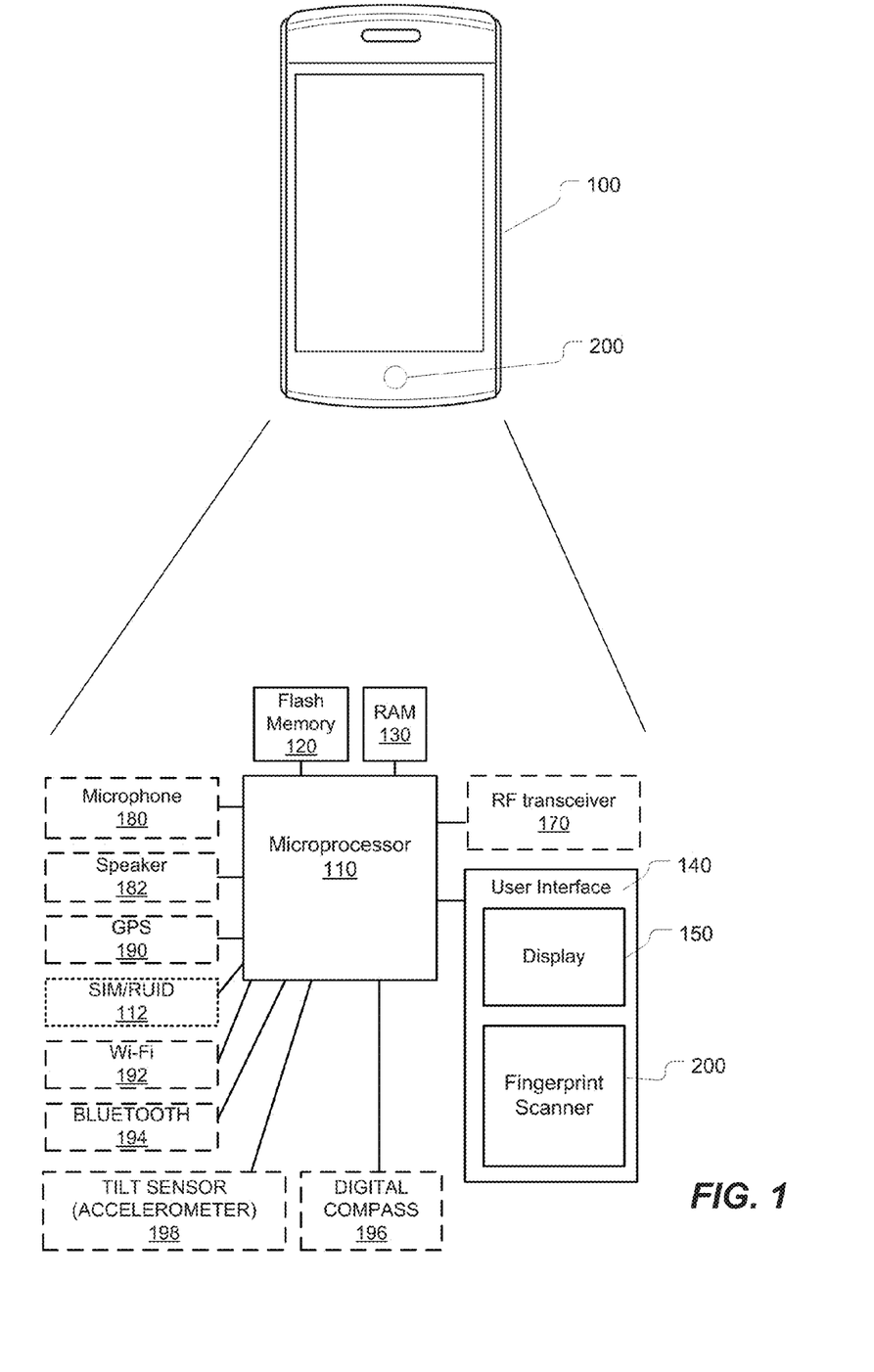
FIG. 1 is a depiction of a mobile device as one example of a computing device which may implement the present technology.

FIG. 1 is a depiction of a mobile device as one example of a computing device on which the present technology may be implemented. This mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications. The user interface 140 may include one or more input/output devices, such as a display screen 150 (e.g. an LCD or LED screen or touch-sensitive display screen), and may optionally include a keyboard or keypad. The user interface may also include an optical jog pad and/or a thumbwheel, trackball, track pad or equivalent.

As depicted by way of example in FIG. 1, the mobile device 100 may include a transceiver 170 for communicating with other devices. The transceiver 170 may be a radiofrequency (RF) transceiver for wirelessly communicating with one or more base stations over a cellular wireless network using cellular communication protocols and standards for both voice calls and packet data transfer such as GSM, CDMA, GPRS, EDGE, UMTS, LTE, etc.

Where the mobile device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

Alternatively, where the computing device is a wired device like a desktop computer, laptop, etc., the transceiver 170 of the computing device 100 may be a modem or equivalent (for wired communications) using, for example, the TCP/IP protocol for Internet data communication. The mobile device 100 may also include one or more ports for wired connections, e.g. USB, HDMI, FireWire (IEEE 1394), etc.

The mobile device 100 optionally includes a speech-recognition subsystem that has a microphone 180 for transforming voice input in the form of sound waves into an electrical signal. The electrical signal is then processed by a speech-recognition module (digital signal processor) to determine keywords or phrases from the voice input. Optionally, the mobile device 100 may include a speaker 182 and/or an earphone jack.

The mobile device 100 optionally includes a position-determining subsystem such as a global navigation satellite system (GNSS) receiver, for example a Global Positioning System (GPS) receiver 190 (e.g. in the form of a chip or chipset) for receiving GNSS (e.g. GPS) radio signals transmitted from one or more orbiting GNSS (e.g. GPS) satellites.

Optionally, the mobile device 100 may include a Wi-Fi™ transceiver 192, a Bluetooth® transceiver 194, and/or a near-field communications (NFC) chip. The computing device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or a tilt sensor or accelerometer 198.

Figure 2:
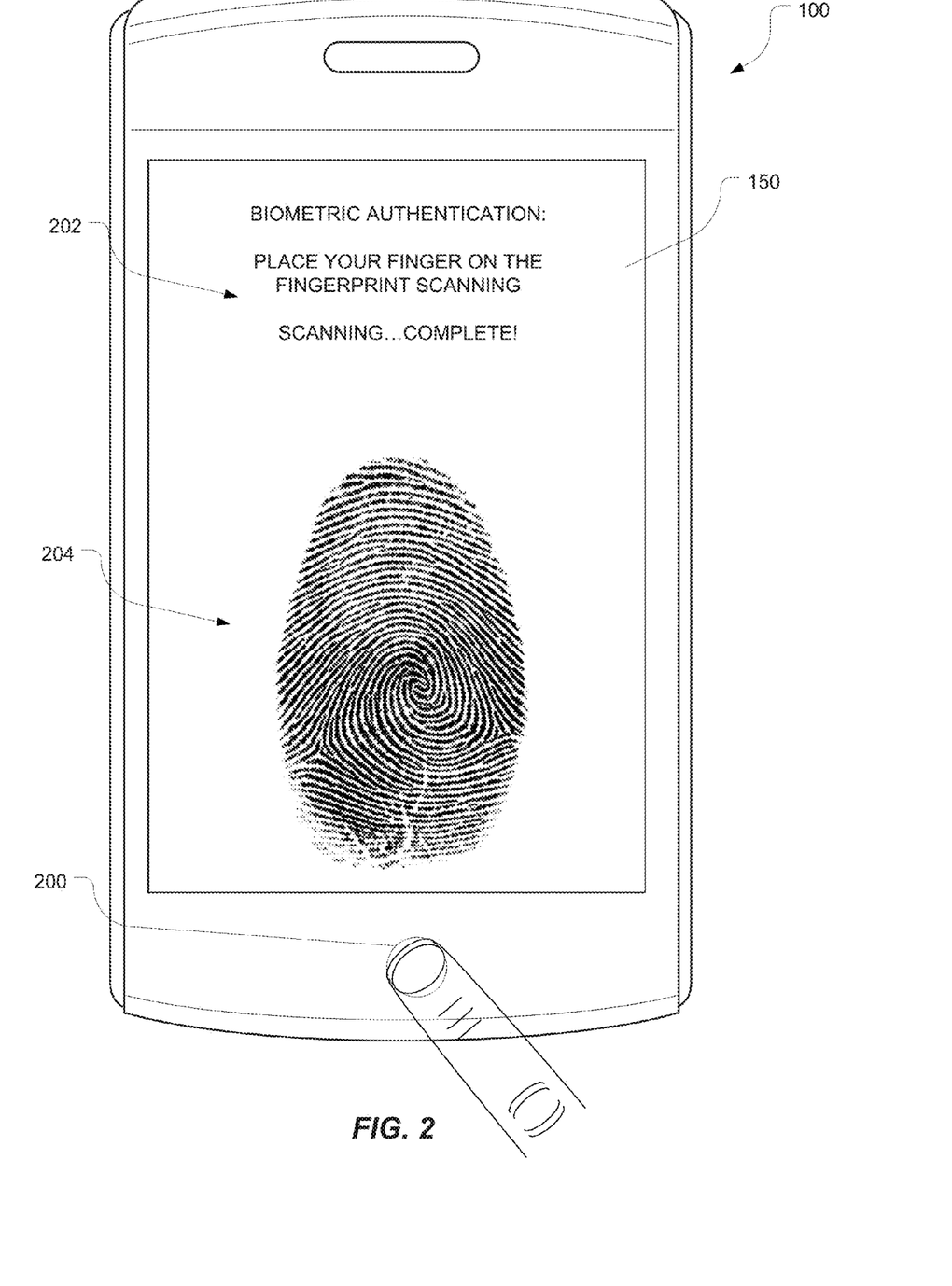
FIG. 2 is a depiction of a mobile device having a fingerprint scanner for scanning a fingerprint.

The mobile device 100 of FIG. 1 may implement various forms of biometric access control by requiring a user to supply a digital fingerprint. For example, device login, login to secure websites or secure applications, banking/financial transactions, etc. may require the user to supply a digital fingerprint for comparison with a previously stored digital fingerprint. As illustrated by way of example in FIG. 2, the mobile device may display a request 202 to provide biometric authentication input in the form of a fingerprint scan. The fingerprint scanner 200 scans the finger to capture a digital fingerprint. Optionally, the scanning status and fingerprint may be displayed on the display 150 of the mobile device 100.

Figure 3:
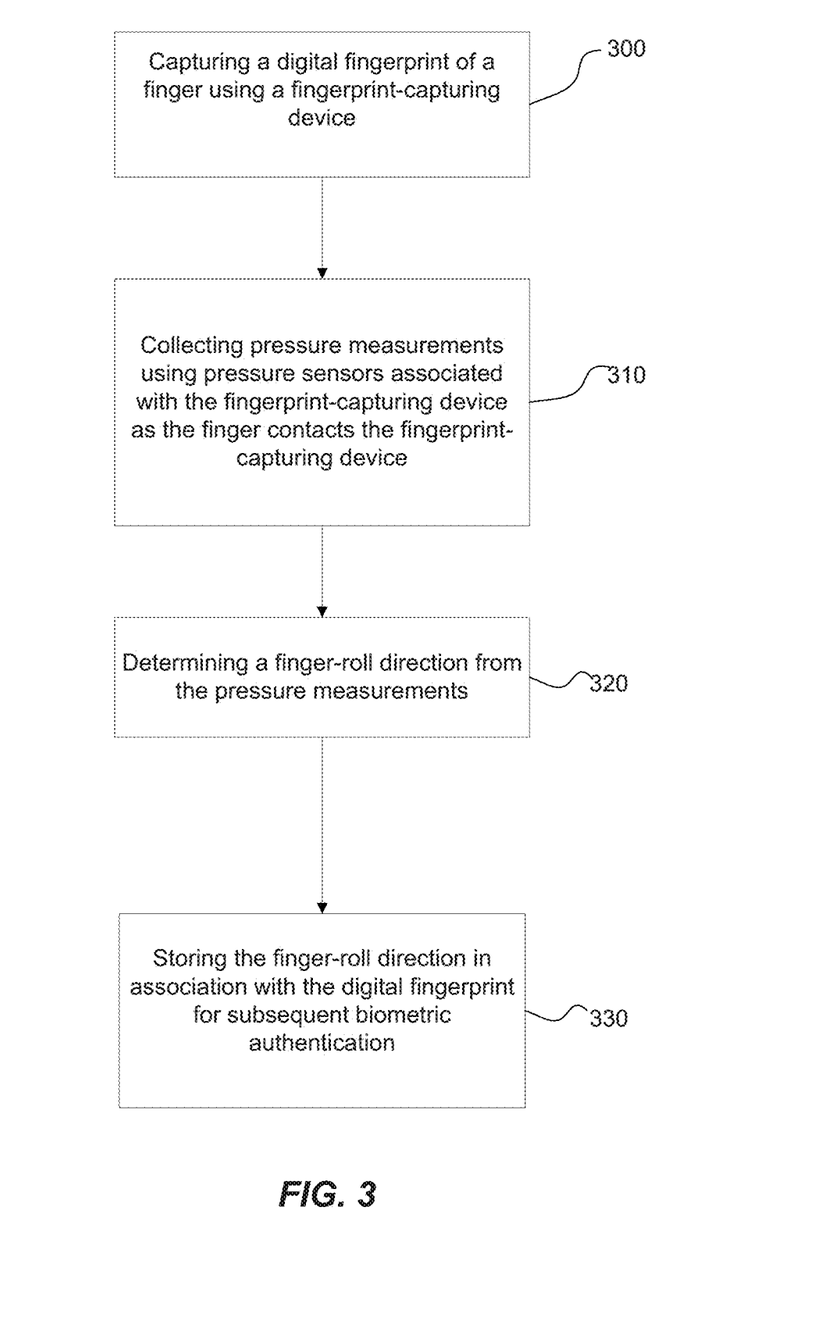
FIG. 3 is a flowchart depicting steps, acts or operations of a fingerprint scanning method.

As illustrated in FIG. 3, the method thus entails a step, act or operation 300 of capturing a digital fingerprint of a finger using a fingerprint-capturing device, a step, act or operation 310 of collecting pressure measurements using pressure sensors associated with the fingerprint-capturing device as the finger contacts the fingerprint-capturing device, a step, act or operation 320 of determining a finger-sensor contact direction (i.e. finger-roll direction) from the pressure measurements, and a step, act or operation 330 of storing the finger-sensor contact direction in association with the digital fingerprint for subsequent biometric authentication. Subsequent biometric authentication involves scanning a fingerprint and comparing the scanned fingerprint against the stored fingerprint. Any suitable fingerprint matching algorithm may be employed for the comparison, e.g. minutiae matching, correlation matching or ridge matching or a combination thereof.

Figure 4:
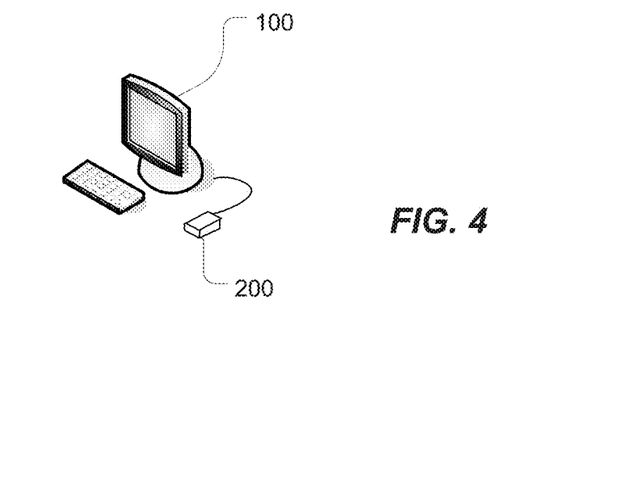
FIG. 4 depicts a desktop computer with an externally connected fingerprint-scanning device.

As noted above, the present technology may used by a mobile device (wireless communications device, smart phone, cell phone, tablet, laptop, palmtop, portable navigation device, smart card reader, etc.). The technology may also be used for any other fixed computing device (e.g. desktop personal computer) such as the desktop computer 100 depicted by way of example in FIG. 4 which has an externally connected fingerprint-capturing device 200 (or external accessory device). The external accessory device 200 may also, in other embodiments, be connected to a mobile device via a wired or wireless connection. It may optionally include a tilt sensor or accelerometer to also register the tilt or orientation.

Figure 5:
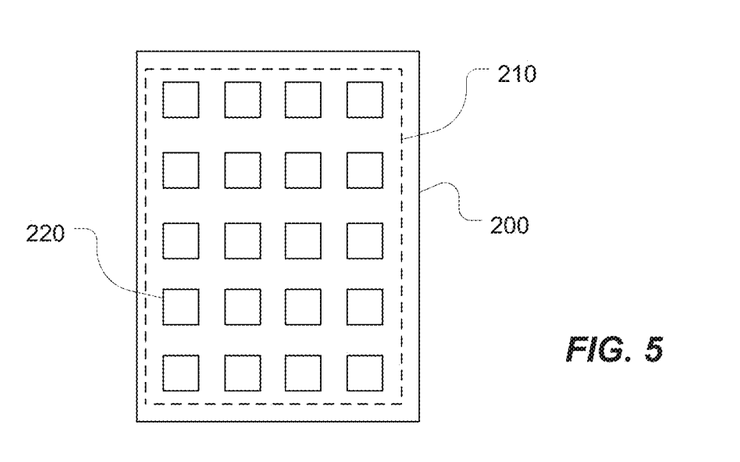
FIG. 5 is a schematic top view of the fingerprint-scanning device showing an array of force sensors.
Figure 6:
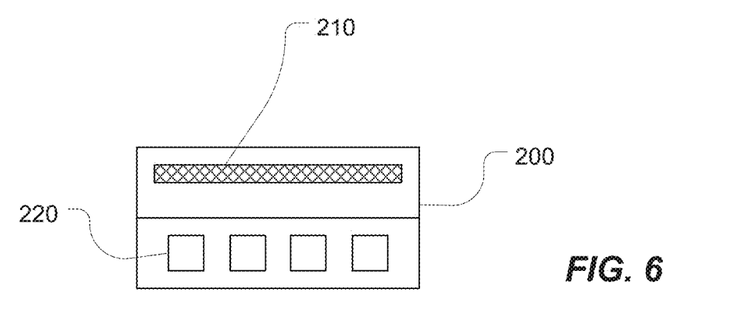
FIG. 6 is schematic side view of the fingerprint-scanning device.

In the embodiment illustrated by way of example in FIGS. 5 and 6, the fingerprint-capturing device 200 includes optical, ultrasonic or capacitance-based sensors 210 disposed beneath a glass surface or platen. In addition, the device 200 includes pressure sensors 220 (which may be any suitable pressure transducers, force transducers, load cells or strain gauges, including for example, force-sensing resistors, piezoelectric transducers, etc.). These pressure sensors 220 are associated with the fingerprint-capturing device to collect pressure measurements as the finger contacts the fingerprint-capturing device. These pressure sensors may be embedded or incorporated within the device 200.

The processor 110 of the computing device is configured to determine a finger-sensor contact direction from the pressure measurements and to cause the memory to store the finger-sensor contact direction in association with the digital fingerprint for subsequent biometric authentication. In a variant, the device 200 may have its own microprocessor, programmable logic controller, or circuitry to determine the finger-sensor contact direction. The finger-sensor contact direction (i.e. finger-roll direction) may be represented by a single line or vector or a series of sequential lines or vectors. The finger-sensor contact direction may be represented by a single curved line or by a series of sequential curved lines.

In one implementation, the method further entails determining a contact force for each of the pressure sensors while the finger contacts the fingerprint-capturing device and creating a force profile along the finger-sensor contact direction (i.e. finger-roll direction). In the example of FIG. 5, an array or matrix of force values may be created by obtaining a measurement at each force sensor (pressure sensor). For example, the force $F(1,1)$ at the sensor in column 1, row 1 is X Newtons, i.e. $F(1,1)=xN$. A complete matrix of time-varying force values may thus be determined for $F(1,1)$ to $F(N,M)$ where N is the number of columns and M is the number of rows of sensors. The force profile at each sensor may also be time variant as well to provide a more sophisticated time-variant force distribution model. The force values are stored with a tolerance or range (delta X) to permit some reasonable degree of variation in the force applied by the user during subsequent authentication.

In one implementation, the method further entails determining a total contact time along the finger-sensor contact direction. This contact time characterizes the speed with which the finger rolls over the fingerprint scanner/sensor. The contact time is another characteristic of the user that can be used to identify the user in addition to the digital fingerprint. Alternatively, the contact time for each sensor may be measured. This may be stored with a time tolerance or range (delta). In one embodiment, the delta is greater for the outermost sensors.

In one implementation, in which the fingerprint-capturing device is part of a mobile device as shown in FIG. 1, the method further entails determining a tilt angle of the fingerprint-capturing device using an accelerometer of the mobile device. In a further variant of this implementation, the method further entails measuring variations in tilt while the finger contacts the fingerprint-capturing device and determining a tilt profile along the finger-sensor contact direction.

The roll direction, time-varying pressure distribution model (force distribution model), total contact time and tilt profile may be combined to generate a highly personalized model of how the user physically interacts with the fingerprint scanner. The mechanics of the contact between the user's finger and the sensor thus constitute a personal motion and force profile that are highly characteristic of the user and are thus useful in biometrically identifying the user. These personal motion characteristics augment the biometric profile of the user to provide higher security than a digital fingerprint alone.

Storing various biometric profiles enables a tiered authentication scheme to control access to various different features, functions or applications. For example, low sensitivity applications (e.g. access to a social network site) may be made more easily accessible than high sensitivity applications (e.g. an online banking site). In one implementation of the method, therefore, the device captures and stores a first finger-sensor contact direction with a first digital fingerprint to define a first biometric authentication profile and captures and stores a second finger-sensor contact direction with a second digital fingerprint to define a second biometric authentication profile. If the user authentication matches the first biometric authentication profile, the device grants access to a first set of device functions, e.g. all device functions (or any high-security or high-sensitivity function, feature or app). On the other hand, user authentication matching the second biometric authentication profile grants access to a second set of device functions, e.g. a subset of the device functions (or any low-sensitivity applications or features). In another implementation, it is not necessary to explicitly enrol multiple profiles. In this other implementation, the user scans a fingerprint multiple times in exactly the same way to generate N authentication schemes based on {direction, pressure, speed, fingerprint, etc.}, then automatically create the different security profiles by combining groups of them—for example—low is {fingerprint}, medium is {finger, direction}, high is {all}.

As a variant of this tiered scheme, the device may require only a matching fingerprint scan for access to low-sensitivity applications or functions but requires the scan plus the finger-sensor contact direction to access high-sensitivity applications or functions. The user may configure the device to identify those features, functions or applications for which the augmented biometric authentication profile (fingerprint plus direction) is required.

Figure 7:
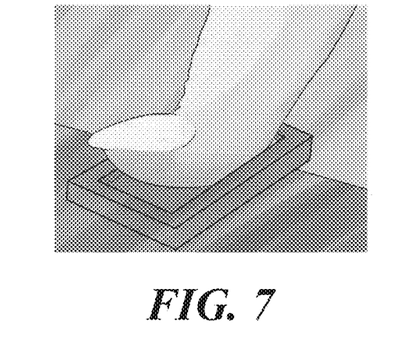
FIG. 7 depicts a thumb contacting a fingerprint-scanning device.
Figure 8:
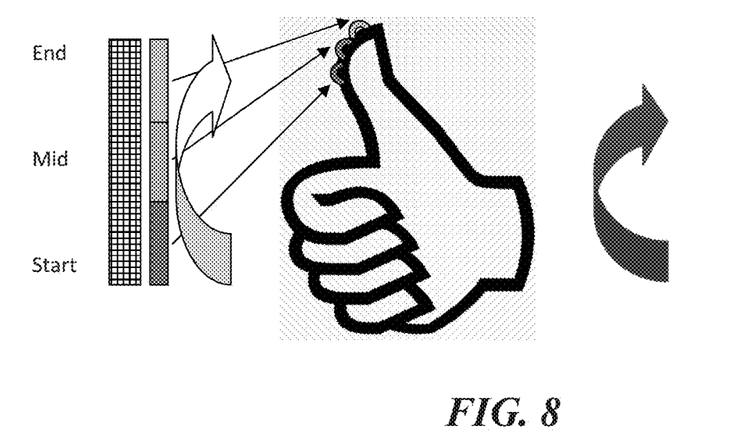
FIG. 8 depicts the rolling contact between the thumb and the fingerprint-scanning device.
Figure 9:
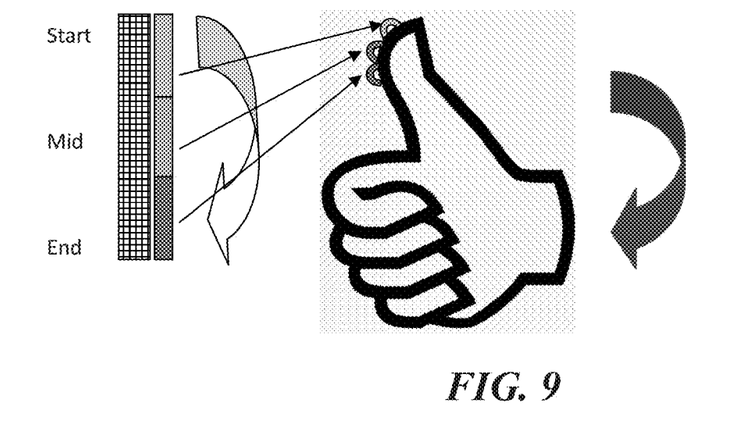
FIG. 9 depicts a thumb roll in a reverse direction.

The embodiments of the present technology exploit the mechanics of the human forearm, hand and fingers. It is observed that the bone structure of the human forearm and hand inhibit the thumb (or finger) from approaching the sensor in a perfectly horizontal manner. As a consequence, it is observed from the kinematics of the thumb (or finger) that the thumb (or finger) starts to the make contact around its mid section (as shown in FIG. 7) and, as further pressure is exerted, the tip/end section of the thumb (or finger) then also makes contact. The kinematics are depicted schematically in FIG. 8. As shown in FIG. 9, even if the sequence (midsection to tip) is reversed (tip to midsection), a usable, recognizable scan can still be captured. Although a full pad (with a matrix/array of sensors) is illustrated in FIGS. 5-6, the fingerprint-capturing sensor may be a thin bar having only one row of sensors instead of a matrix of sensors. In another variant, the sensor plate may have a single row of sensors that are wider to span substantially the entire scanner. In other embodiments, the pressure-sensing elements in the array of the scanner may be used to control a pointer on the screen and to receive user input (a user selection analogous to pressing a track pad).

Figure 10:
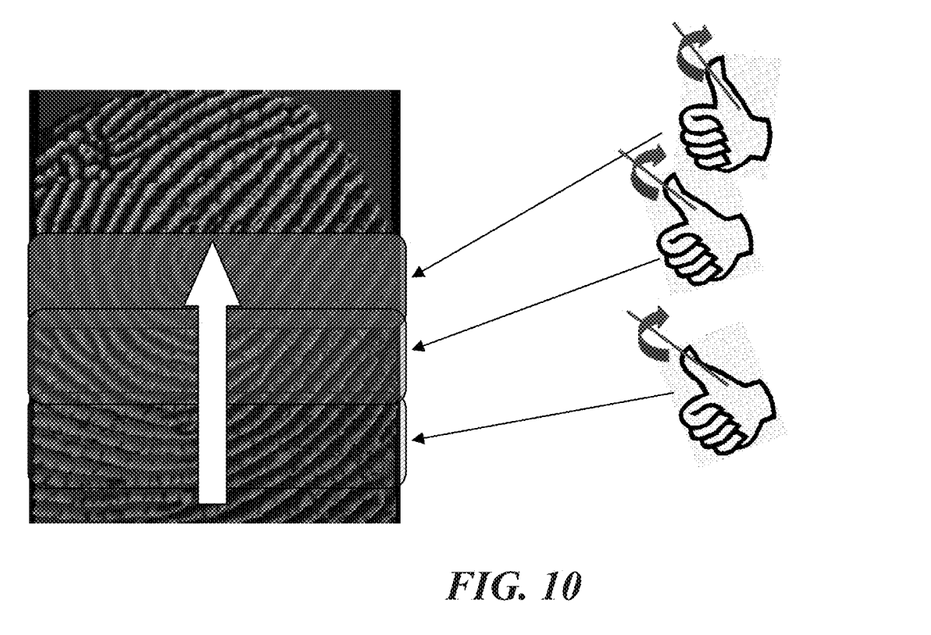
FIG. 10 depicts a changing pressure distribution as the thumb rolls onto the scanner.
Figure 11:
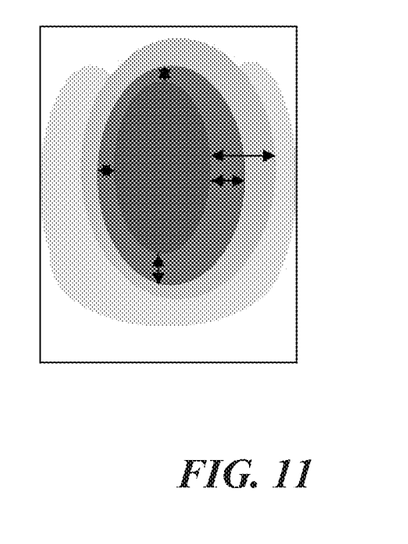
FIG. 11 shows a kinematic map of the thumb contacting the scanner.
Figure 12:
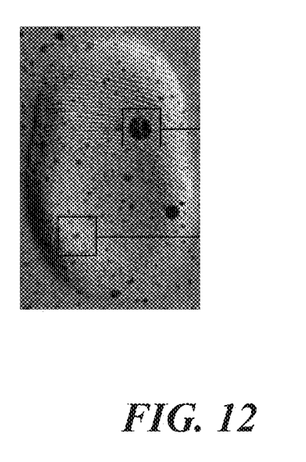
FIG. 12 shows how particular visual characteristics or artefacts may be visible in the fingerprint scan at certain forces or pressures.

The kinematics and/or dynamics of the finger roll (particularly direction and speed and force distribution) can be measured as the user scans his or her finger. These kinematic or dynamic values may be associated with the fingerprint scan to provide an augmented biometric profile. In one embodiment, the device builds a kinematic model of the finger roll (direction and speed) by detecting the direction of finger roll or thumb roll. In another embodiment, the kinematic model is augmented to become a dynamic model by further measuring force distribution (or pressure distribution) as the finger contacts the scanner. The sensors registering the highest forces (loads) may be used to plot the direction of the thumb roll. FIG. 10 shows by way of example a pressure distribution as the thumb rolls onto the scanner. FIG. 11 shows a kinematic (motion) map of the thumb contacting the scanner. FIG. 12 shows how particular visual characteristics or artefacts may be visible in the fingerprint scan at certain forces or pressures. These artefacts may also be characteristic of the user.

Figure 13:
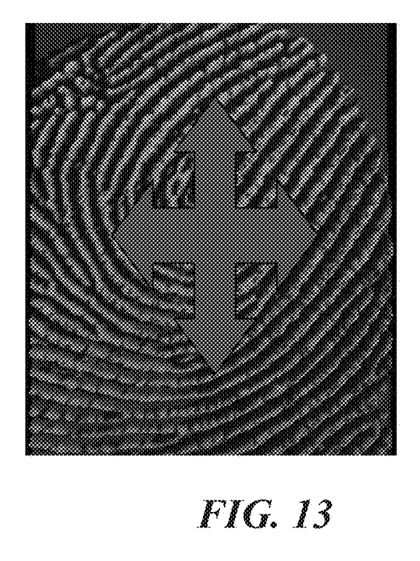
FIG. 13 depicts four general roll directions for categorizing user input.

In the case of the roll direction, the directional precision required to adequately mimic the roll direction may be reconfigurable or adjustable. For example, the input roll direction may need to be within a predetermined angular threshold of the sample roll direction for the device to declare the roll direction to be an adequate match. This angular threshold may be adjusted, either manually or automatically based on monitoring prior input, to permit some reasonable variations in roll direction. In another implementation, the device may generally categorize the directions as follows: (1) roll top to bottom, (2) roll bottom to top, (3) roll left to right, (4) roll right to left, (5) swipe up and (6) swipe down. Simplified directions are depicted by way of example in FIG. 13.

In another implementation, each of the ten fingers of the user may be scanned. An access code may thus require a user-defined sequence of scans of different fingers. For example, the user may configure the device to request a sequence of scans such as left forefinger (i.e. left index finger), right thumb, left thumb, right ring finger, left pinky finger. To further complicate the authentication process, the roll direction for each scan may be specified. For example, left index finger (roll right), right thumb (roll up), left thumb (roll down), right ring finger (roll left), left pinky finger (roll right). Authentication thus depends not only on the fingerprint scans matching their respective exemplars (previously saved fingerprints) but also on the correct sequence of scans and correct roll direction for each finger.

A collateral benefit of the finger rolling over the fingerprint scanner is that the scanner can detect more of the fingerprint than if the finger were to be pressed flat against the scanner. For example, if the finger is rolled from left to right, part of the fingerprints on each side of the finger can be scanned. Similarly, if the finger rolls from bottom to top, it is possible to collect much more of the fingerprint from the bottom portion of the finger. By collecting and using this extra fingerprint information, it is more difficult for an attacker who has lifted a fingerprint from a glass or other object because a lifted fingerprint typically would only include the smaller flat portion of the fingerprint. Since the fingerprint roll includes a larger image that includes the peripheral contours of the fingerprint (i.e. sides and forward tip portion), an attacker would be hard pressed to reproduce enough of the fingerprint to make an attack successful.

The amount (i.e. total surface area) of fingerprint scanned may be also be used to determine the security profile that is used by the device. In other words, if the scan includes the peripheral contours (sides and/or tip portion of the finger in addition to the underside of the finger) this greater surface area of scan may be used by the device to grant a higher level of access than a scan of smaller area, e.g. a scan limited to only the underside of the finger. To implement this, the processor is configured to compare a total surface area of the scanned fingerprint to a predetermined threshold, to grant access to a first set of applications if the threshold is met or exceeded and to grant access to a second set of applications if the threshold is not exceeded. For example, if the user is attempting to access a low-security application and scans a fingerprint in such a way as to only capture part of the fingerprint, e.g. the underside only, access would still be allowed without requesting the user to re-scan the fingerprint since what was scanned is considered to be sufficient for the application needed. If the security of the application is considered to be high, the device may ask the user to re-scan the fingerprint. The device may display a notification to the user that limited access is being granted in view of the limited size of the scanned fingerprint. Alternatively, the device may display a notification asking the user whether he or she wishes to re-scan the fingerprint in order to gain greater access to the higher-security applications or functions of the device.

In addition to the fingerprint scan and finger-sensor contact direction, the device may also rely on other concurrent authentication input to provide multi-factor authentication of the user. This further input may be in the form of a username and/or password, smart card PIN, cryptographic token, personal verification question(s), voiceprint, facial recognition, retina scan or other environmental data such as the current position of the device.

For the purposes of this specification, it is to be understood that references to "finger" include the thumb. Likewise, references to "thumb" shall be understood as being applicable to a finger. Similarly, the expression "fingerprint" is meant to include a thumbprint.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A computer-implemented method comprising:
   capturing a digital fingerprint of a finger using a fingerprint-capturing device;
   collecting pressure measurements using pressure sensors associated with the fingerprint-capturing device as the finger contacts the fingerprint-capturing device;
   determining a finger-sensor contact direction from the pressure measurements; and
   storing the finger-sensor contact direction in association with the digital fingerprint for biometric authentication, wherein the biometric authentication succeeds upon recapturing the digital fingerprint with the associated finger-sensor contact direction.

2. The method as claimed in claim 1 further comprising determining a contact force for each of the pressure sensors while the finger contacts the fingerprint-capturing device and creating a force profile along the finger-sensor contact direction.

3. The method as claimed in claim 2 further comprising determining a total contact time along the finger-sensor contact direction.

4. The method as claimed in claim 3 wherein the fingerprint-capturing device is part of a mobile device and wherein the method further comprises determining a tilt angle of the fingerprint-capturing device using an accelerometer of the mobile device.

5. The method as claimed in claim 4 further comprising measuring variations in tilt while the finger contacts the fingerprint-capturing device and determining a tilt profile along the finger-sensor contact direction.

6. The method as claimed in claim 1 further comprising storing a first finger-sensor contact direction with a first digital fingerprint to define a first biometric authentication profile and storing a second finger-sensor contact direction with a second digital fingerprint to define a second biometric authentication profile, wherein user authentication matching the first biometric authentication profile grants access to all first set of device functions whereas user authentication matching the second biometric authentication profile grants access to a second set of the device functions.

7. A non-transitory computer-readable medium comprising instructions in code which when loaded into a memory and executed by a processor of a computing device cause the computing device to:
   capture a digital fingerprint of a finger using a fingerprint-capturing device;
   collect pressure measurements using pressure sensors associated with the fingerprint-capturing device as the finger contacts the fingerprint-capturing device;
   determine a finger-sensor contact direction from the pressure measurements; and
   store the finger-sensor contact direction in association with the digital fingerprint for biometric authentication, wherein the biometric authentication succeeds upon recapturing the digital fingerprint with the associated finger-sensor contact direction.

8. The computer-readable medium as claimed in claim 7 further comprising code that causes the device to determine a contact force for each of the pressure sensors while the finger contacts the fingerprint-capturing device and to create a force profile along the finger-sensor contact direction.

9. The computer-readable medium as claimed in claim 8 further comprising code that causes the device to determine a total contact time along the finger-sensor contact direction.

10. The computer-readable medium as claimed in claim 9 wherein the computing device is a mobile device and wherein the computer-readable medium further comprises code that causes the device to determine a tilt angle of the fingerprint-capturing device using an accelerometer of the mobile device.

11. The computer-readable medium as claimed in claim 10 further comprising code to cause the device to measure variations in tilt while the finger contacts the fingerprint-capturing device and to determine a tilt profile along the finger-sensor contact direction.

12. The computer-readable medium as claimed in claim 7 further comprising code for storing a first finger-sensor contact direction with a first digital fingerprint to define a first biometric authentication profile and for storing a second finger-sensor contact direction with a second digital fingerprint to define a second biometric authentication profile, wherein user authentication matching the first biometric authentication profile grants access to a first set of device functions whereas user authentication matching the second biometric authentication profile grants access to a second set of the device functions.

13. A computing device comprising:
   a fingerprint-capturing device for capturing a digital fingerprint of a finger;
   pressure sensors associated with the fingerprint-capturing device to collect pressure measurements as the finger contacts the fingerprint-capturing device;
   wherein the processor is configured to determine a finger-sensor contact direction from the pressure measurements and to cause the memory to store the finger-sensor contact direction in association with the digital fingerprint for biometric authentication, wherein the biometric authentication succeeds upon recapturing the digital fingerprint with the associated finger-sensor contact direction.

14. The device as claimed in claim 13 wherein the processor cooperates with the pressure sensors to determine a contact force for each of the pressure sensors while the finger contacts the fingerprint-capturing device and to create a force profile along the finger-sensor contact direction.

15. The device as claimed in claim 14 wherein the processor cooperates with the pressure sensors to determine a total contact time along the finger-sensor contact direction.

16. The device as claimed in claim 15 further comprising an accelerometer to determine a tilt angle of the fingerprint-capturing device.

17. The device as claimed in claim 16 wherein the processor cooperates with the accelerometer to measure variations in tilt while the finger contacts the fingerprint-capturing device and to determine a tilt profile along the finger-sensor contact direction.

18. The device as claimed in claim 13 wherein the processor cooperates with the memory to store a first finger-sensor contact direction with a first digital fingerprint to define a first biometric authentication profile and to store a second finger-sensor contact direction with a second digital fingerprint to define a second biometric authentication profile, wherein user authentication matching the first biometric authentication profile grants access to a first set of device functions whereas user authentication matching the second biometric authentication profile grants access to a second set of the device functions.

19. The device as claimed in claim 13 wherein the processor cooperates with the pressure sensors to determine a contact time for each sensor.

20. The device as claimed in claim 13 wherein the processor is configured to: compare a total surface area of the scanned fingerprint to a predetermined threshold; grant access to a first set of applications if the threshold is met or exceeded; and grant access to a second set of applications if the threshold is not exceeded.

\* \* \* \* \*